Figure 1:
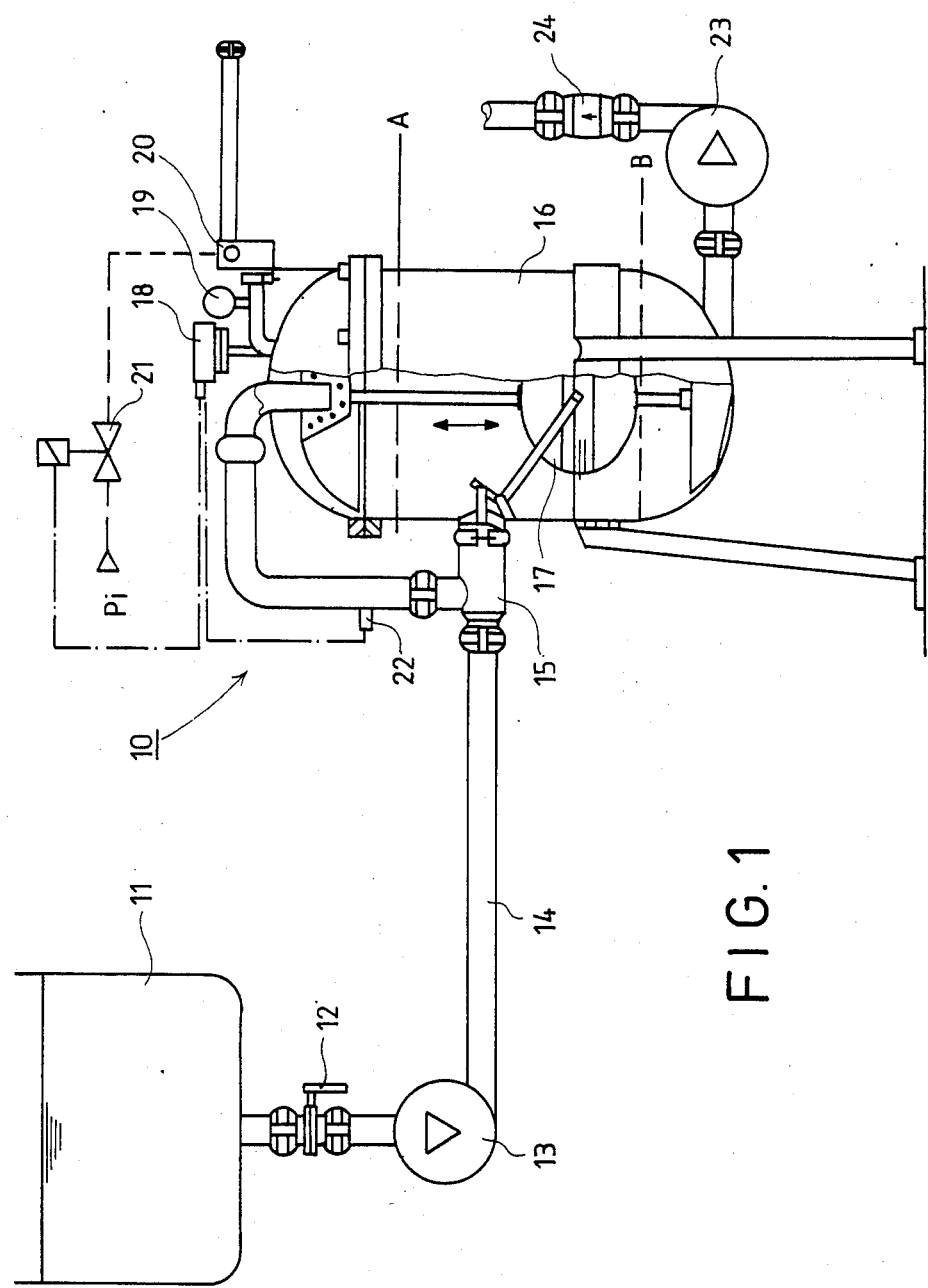

United States Patent [19]

Kujala

[11] Patent Number: 4,704,140
[45] Date of Patent: Nov. 3, 1987

[54] PROCEDURE AND MEANS FOR USE IN PUMPING AND VOLUMETRY OF FOODSTUFF LIQUIDS

[75] Inventor: Hannu Kujala, Helsinki, Finland
[73] Assignee: Oy Hackman AB, Finland
[21] Appl. No.: 915,247
[22] PCT Filed: Feb. 14, 1986
[86] PCT No.: PCT/FI86/00018
    § 371 Date: Sep. 18, 1986
    § 102(e) Date: Sep. 18, 1986
[87] PCT Pub. No.: WO86/04828
    PCT Pub. Date: Aug. 28, 1986

[30] Foreign Application Priority Data
    Feb. 15, 1985 [FI] Finland .................................. 850640

[51] Int. Cl.⁴ ............................................. B01D 19/00
[52] U.S. Cl. ................................... 55/55; 55/169;
                137/9; 137/101.27; 137/398; 137/434
[58] Field of Search .................... 55/55, 165, 169, 189,
        55/219; 137/571, 397, 398, 450, 413, 434, 435,
                                                    101.27, 9

[56] References Cited

U.S. PATENT DOCUMENTS

| 1,350,576 | 8/1920 | Smith | 55/166 |
| 1,554,471 | 9/1925 | Trumble | 55/169 |
| 1,782,783 | 11/1930 | Kotzebue | 55/169 |
| 2,861,647 | 11/1958 | Musslewhite | 55/169 |
| 3,362,136 | 1/1968 | Burnham, Sr. et al. | 55/165 |
| 4,010,012 | 3/1977 | Griffin, III et al. | 55/169 |
| 4,316,725 | 2/1982 | Hovind et al. | 55/41 |

FOREIGN PATENT DOCUMENTS

| 2648058 | 1/1978 | Fed. Rep. of Germany . |
| 2931003 | 2/1980 | Fed. Rep. of Germany . |
| 64789 | 9/1983 | Finland . |
| 83043992 | 2/1985 | Sweden . |
| 811572 | 4/1959 | United Kingdom . |

Primary Examiner—Bernard Nozick
Attorney, Agent, or Firm—Steinberg & Raskin

[57] ABSTRACT

The invention concerns a procedure and a means for use in pumping and volumetry of foodstuff liquids. According to an embodiment of the invention, the foodstuff liquid is conducted through a suction pipe (14) or a suction tube into an air separator (16) and from the air separator (16) through a pumping device (23) further onwards. The air present among the foodstuff liquid is separated in the air separator (16) with the aid of vacuum in that a vacuum device (20) is activated when the pressure prevailing in the air separator (16) is higher than a preset value. The flow of the foodstuff liquid to the air separator (16) is controlled with a control device (15) disposed in the suction pipe (14), this control device being controlled in accordance with the level of the foodstuff liquid in the air separator (16). When the level of the foodstuff liquid reaches in the air separator (16) an upper level (A) dependent on the magnitude of the flow the control device (15) has been arranged to be fully closed, and when the level of the foodstuff liquid reaches in the air separator (16) a lower level (B) dependent on the magnitude of the flow the control device (15) has been arranged to be fully open, and vice versa. When the level of the foodstuff liquid is rising in the air separator (16) between said upper level (A) and said lower level (B) the control device (15) has been arranged to reduce, and when the level is falling to increase, the foodstuff liquid flow entering the air separator (16).

8 Claims, 3 Drawing Figures

PROCEDURE AND MEANS FOR USE IN PUMPING AND VOLUMETRY OF FOODSTUFF LIQUIDS

One of the objects of the present invention is procedure for use in air separation pumping and volumetry of foodstuff liquids, in said procedure the foodstuff liquid being conducted through a suction pipe or suction tube to an air separator and from the air separator through a pumping device and, possibly, a volumetric device into a tank or equivalent, and in said procedure the air present amont the foodstuff liquid being separated in the air separator with the aid of vacuum in that the vacuum device is activated when the pressure prevailing in the air separator exceeds a given preset value.

Another object of the invention is a means for use in air separation pumping and volumetry of foodstuff liquids, said means comprising a suction pipe or suction tube, a control valve, an air separator, provided with a vacuum device for removing the air from the foodstuff liquid in the air separator, and possibly a volumetric device, by this means the foodstuff liquid being drawn from the liquid tank or equivalent into the air separator, whence the foodstuff liquid is conducted through a pumping device and, possibly, a volumetric device towards further use.

One further object of the invention is a procedure for use in air separation pumping and volumetry of foodstuff liquids, in said procedure and foodstuff liquid being conducted through a suction pipe or suction tube to an air separator and from the air separator through a pumping device and, possibly, a volumetric device into a tank or equivalent, and in said procedure the air that is present among the foodstuff liquid being separated in the air separator with the aid of vacuum in that an air venting valve connected to the air separator is activated when the pressure prevailing in the air separator exceeds a given preset value.

Still one object of the invention is a means for use in air separation pumping and volumetry of foodstuff liquids, said means comprising a suction pipe or suction tube, an air separator provided with an air venting valve, a pumping device, and a control valve, by said means the foodstuff liquid being drawn from a liquid tank or equivalent into the air separator, whence the foodstuff liquid is conducted through a pumping device and a control valve towards further use.

Liquid volumetry is carried out, for instance, in milk collection from milk producers taking place with the aid of tank lorries, or when receiving milk in a dair from such tank lorries. The milk is pumped, or allowed to flow, through a pipe system into an air separator tank, in which the milk level rises until a shut-off member, attached to the stem of a float sensing the liquid level, finally closes the air aperture leading to an air venting valve. The closure of the air venting valve may be managed either mechanically or electrically. Hereby an enclosed system is established in the upper part of the air separator tank, in this system a pressure building up gradually, and upon reaching a given value this pressure overcomes the spring force of the directional valve, causing the directional valve to open. The liquid then begins to flow through the apparatus, and the flow goes on until the air present in the liquid stops the operation and escapes through the air venting valve, or until the liquid runs out and nothing but air is pushed out through the pipe.

In the Finnish Pat. No. 64789, among others, is disclosed a volumetric system especially applied to milk collection with the aid of tank lorries from milk producers, in said system the liquid being conducted through a suction pipe or suction tube to an air separator and from the air separator to a volume meter, and in said system being provided a pumping device which has been so disposed in relation to the air separator that the air separator is located on the intake side of the pumping device, the pumping device being controlled with the aid of a control system so that when the liquid level in the air separatorr rises to a first upper level the control system has been arranged to switch the pumping device to low pumping rate, and when the liquid level therein rises in the air separator to a second upper level, higher than the first upper level, the control system is arranged to switch the pumping device to operate at a higher pumping rate.

The above-described types of measuring apparatus are however encumbered by certain drawbacks which have an unfavourable effect on the accuracy of measurement, on the unfavourable influence which the air exerts on the structure of the liquid, and particularly on the active participation of oxygen in deteriorating the foodstuff constituents. In applications, rather complex designs have been developed, their operation, maintenance, susceptibility to dirt, requirement of high technology, and other circumstances creating frequent problems in the use of such apparatus. In apparatus of prior art, endeavors have usually aimed merely at removing air bubbles, which give rise to direct errors in volumetric measurement; and, in fact, removal of air dissolved in the liquid has not been an aim in every case.

The object of the invention is to achieve an improvement of presently known procedures in the pumping and volumetry of foodstuff liquids. The more detailed object of the invention is to provide a procedure which is applicable as universally as possible in air separation problems, e.g. on milk collection tank lorries, in the liquid receiving and processing equipment in dairies, breweries, and other equivalent production plants. The aims of the invention are attained with a procedure which is mainly characterized in that the flow of the foodstuff liquid to the air separator is controlled with a control valve disposed in the suction pipe and which is controlled in accordance with the foodstuff liquid level in the air separator so that when the level of the foodstuff liquid rises in the air separator to an upper level the control valve is arranged to be fully closed, and that when the level of the foodstuff liquid reaches in the air separator a somewhat lower level the control valve has been arranged to be fully open, and when the level of the foodstuff liquid is falling in the air separator between said upper and lower levels the control valve has been arranged to increase the foodstuff liquid flow entering the air separator, and when the level of the foodstuff liquid is rising in the air separator between the upper and lower levels the control valve has been arranged to reduce the foodstuff liquid flow entering the air separator.

The aims of the invention are also achieved with a procedure which is characterized in that the control valve disposes in the suction pipe has been arranged to control the foodstuff liquid flow into the air separator so that when the level of the foodstuff liquid in the air separator reached the upper level the control valve has been arranged to be fully closed, and when the level of the foodstuff liquid in the air separator reaches the lower level the control valve has been arranged to be fully open, and when the level of the foodstuff liquid is falling in the air separator between the upper and lower levels the control valve has been arranged to increase the foodstuff liquid flow entering the air separator, and when the level of the foodstuff liquid is rising between the upper and lower levels the control valve has been arranged to reduce the foodstuff liquid flow entering the air separator.

It is furthermore an object of the invention to achieve an improvement in the apparatus presently used in the pumping and volumetry of foodstuff liquids. The more detailed object of the invention is to provide a means which is applicable as universally as possible in connection with air separation problems e.g. on milk collection tank lorries, in the liquid receiving and processing equipment in dairies, breweries, and other equivalent production plants.

The aims of the invention are achieved with a means which is mainly characterized in that the flow of the foodstuff liquid from the air separator through the pumping device further onwards is controlled with a control valve which is controlled in accordance with the level of the foodstuff liquid in the air separator in such manner that when the level of the foodstuff liquid in the air separator reaches the upper level the control valve has been arranged to be fully open, and when the level of the foodstuff liquid in the air separator reaches the lower level the control valve has been arranged to be fully closed, and when the level of the foodstuff liquid is falling in the air separator between the upper and lower levels the control valve has been arranged to reduce the foodstuff liquid flow drawn from the air separator, and when the level of the foodstuff liquid is rising between the upper and lower levels the control valve has been arranged to increase the foodstuff liquid flow drawn from the air separator.

The aims of the invention are further achieved with a means which is characterized in that a control valve has been arranged to control the flow of foodstuff liquid from the air separator through the pumping devcie and onwards in such manner that when the level of the foodstuff liquid in the air separator reaches the upper level the control valve has been arranged to be fully open, and when the level of the foodstuff liquid in the air separator reaches the lower level the control valve has been arranged to be fully closed, and when the level of the foodstuff liquid is falling in the air separator between the upper and lower levels the control valve has been arranged to reduce the foodstuff liquid flow drawn from the air separator, and when the level of the foodstuff liquid is rising between the upper and lower levels the control valve has been arranged to increase the foodstuff liquid flow from the air separator.

It has been understood in the procedures and means of the invention that the guarantee for efficient air separation is increase of the air bubble size caused by vacuum and the change of the water vapour partial pressure in relation to temperature and subatmospheric pressure. These things have been so combined in the invention that improvement of air separation efficiency is achieved even under difficult conditions. No high-standard and sophisticated technology is required on the part of the peripheral appurtus employed in the procedures and associated with the equipment, such as pumps, pipelines, valves, tanks and equivalent. As a result, their operation and control becomes simple and easy to provide for. They can be controlled and operated similarly as is done in apparatus and procedures in which the design of the invention has not been incorporated.

In the following, the inventin is described in detail, referring to certain advantageous embodiments of the invention, presented in the figures of the appended drawiang, yet to which the invention is not meant to be exclusively confined.

FIG. 1 presents schematically an advantageous embodiment of the means employed in the procedure of the invention.

Figure 2:
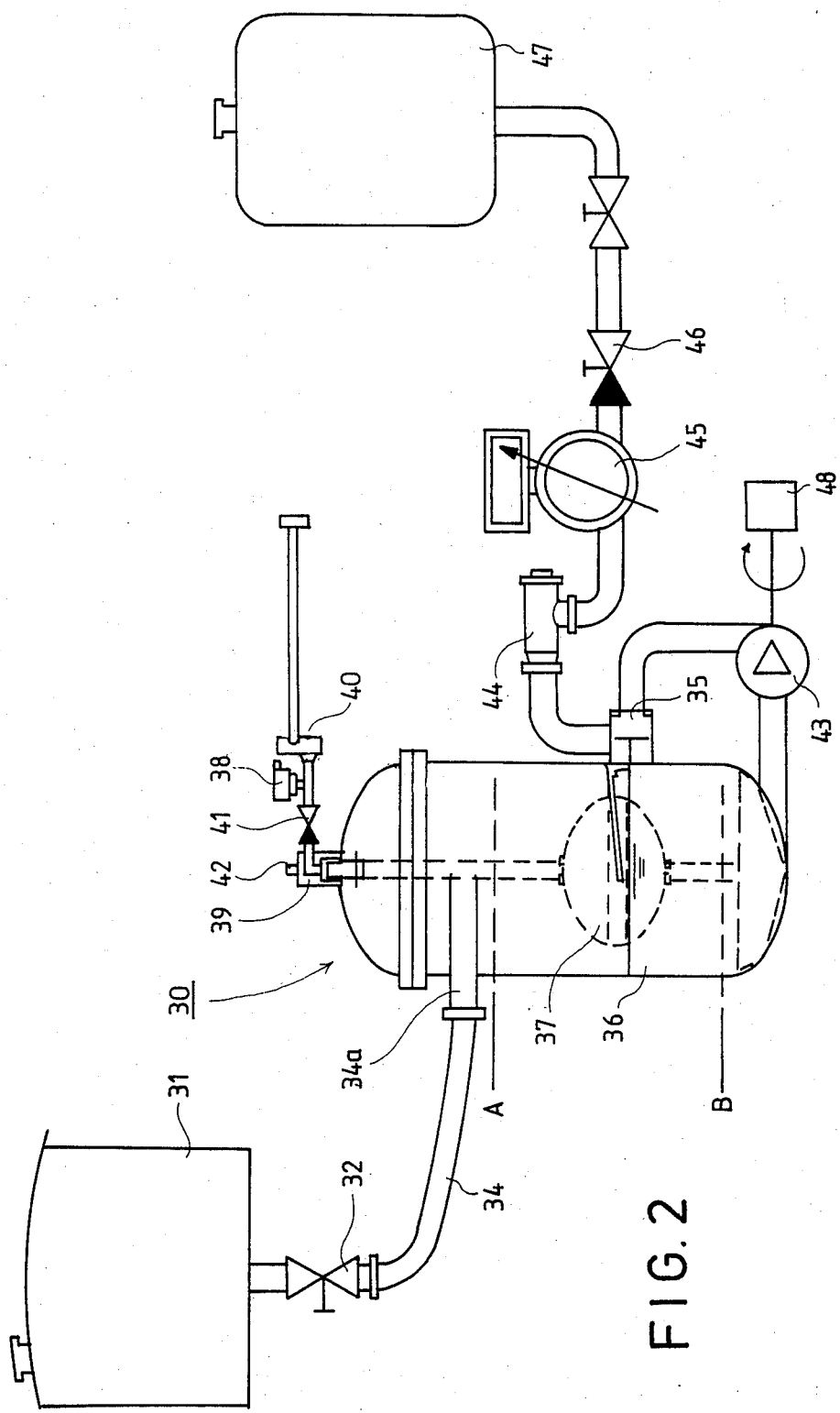

FIG. 2 presents schematically another advantageous embodiment of the means employed in the procedure of the invention.

Figure 3:
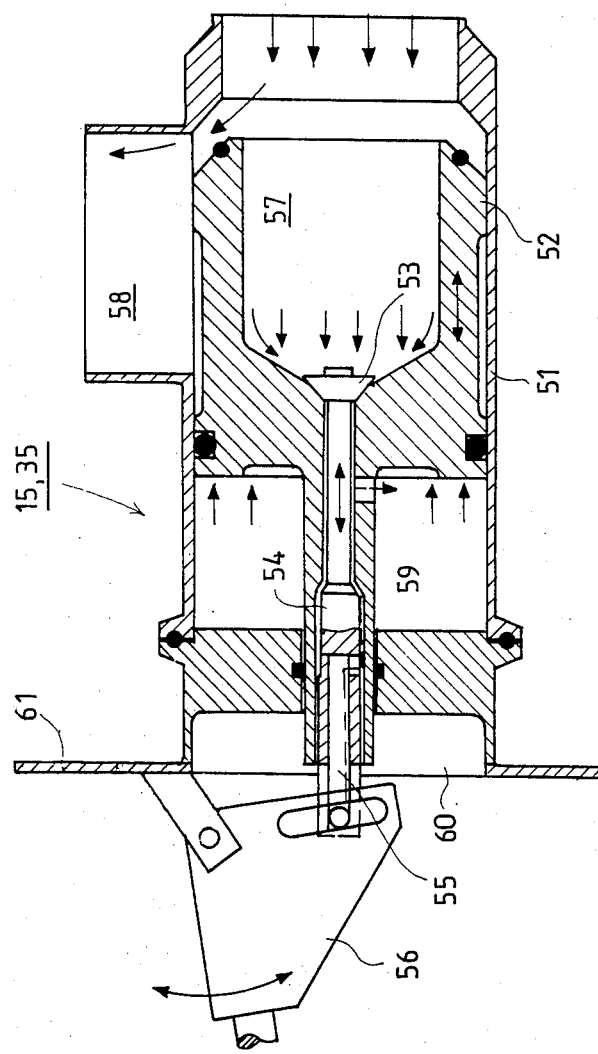

FIG. 3 presents schematically the operation and construction of the control valve employed in the means of the invention.

In the embodiment depicted in FIG. 1, the means of the invention in general has been denoted with the reference numeral 10. The means 10 comprises a liquid tank 11, a suction pipe 14 provided with shut-off valve 12 and pump 13, a control device 15, an air separator 16, a pumping device 23, and a directional valve 24. The air separator 16 is provided with a liquid level sensor 17, a pressure switch 18, a pressure gauge 19, and a vacuum device 20. In the pipe leading from the control device 15 to the air separator 16 has been inserted a temperature pick-up 22, which supplies to the pressure switch 18 a signal consistent with the temperature.

The pressure switch controls a compressed air shut-off valve 21, this valve in its turn communicating with the vacuum device 20.

The operation of the means 10 of the invention runs as follows. The shut-off valve 12 is first opened and the pump 13 started, and the controlling electricity of the compressed air shut-off valve 21 is connected to be controlled by the pressure switch 18. The liquid now begins to flow from the tank 12, and through the pump 13, through the control device 15 into the air separator 16. As the liquid level rises in the air separator 16, the liquid level sensor 17 in the air separator rises along with the liquid level. The liquid level sensor 17 is for instance, as shown in FIG. 1, mechanically connected to the control device 15 so that when the sensor 17 rises upwards the flow cross section in the control device 15 is reduced, whereby the liquid flow into the air separator 16 also diminishes. When the liquid level has risen in the air separator 16 to the prdetermined upper level A, the control device 15 closes completely, thus inhibiting the flow into the air separator 16. Similarly, when the liquid level in the air separator 16 has fallen to the predetermined lower level B, the control device 15 has opened to full aperture and the liquid flow to the air separator 16 is at its maximum.

In the air separator 16 prevails a vacuum (subatmospheric pressure), which has been set in advance with the pressure switch 18. When the vacuum in the air separator 16 has reached its set value, the pressure switch shuts off the compressed air supply to the shutoff valve 21. The vacuum device 20 keeps the vacuum at the preset pressure height. The vacuum device 20 contains a one-way valve, no return flow into the air separator 16 taking place after this valve has closed. The pressure gauge 19 indicates the vacuum prevailing at any given time, and it is used as aid in setting the limit value of the pressure with the pressure switch 18.

Hereafter, the pumping device 23 is started, whereby the liquid flows through the directional valve 24 into the pipe system and thence further into a tank or equivalent. The operation of the pump 23 may be intermittent or continuous because the means 10 adapts itself to the flow conditions prevailing at any given time. The pump 13 is not absolutely necessary in the apparatus if flow conditions are such that they render the operation of the means 10 feasible even otherwise. This is understood to refer, for instance, to those instances in which the liquid tank 11 is located so much higher than the air separator 16 that the liquid flows freely with sufficient pressure from the liquid tank 11 to the air separator 16.

The control device 15 changes the flow velocity of the liquid consistent with the liquid level height in the air separator so that the control device 15 maintains the same liquid flow which the pumping device 23 transports forward from the air separator 16 at any given time. The vacuum device 20 maintains in the air separator 16 the degree of subatmospheric pressure that has been set. The setting of the pressure switch 18 can be changed in accordance with temperature so that the vacuum is changed consistent with the vapour pressure of the liquid at the measured temperature. The temperature is measured in the liquid with the temperature pick-up 22.

The means of the invention, 10, removes the air bubbles from the liquid, as well as part of the dissolved air or all of it, or even removes part of the liquid according to the evaporation principle, and such liquid may later be returned to join the rest of the liquid, or it may be left unreturned.

In the embodiment of FIG. 2, the means of the invention in general is indicated by reference numeral 30. As shown in FIG. 2, the means of the invention, 30, has been connected to a liquid tank 31, which may be, for instance, a farm milk tank, a milk lorry or equivalent. From the tank 31, the liquid is conducted through the shut-off valve 32 of the tank and through a suction tube 34 to the liquid entrance connector 34a, and hence further to the air separator 36. The air separator 36 is provided with a liquid level sensor 37, a pressure switch 38, an air venting valve 39 comprising a push button 42 inhibiting closure of the valve, and a directional valve 41. As shown in FIG. 2, to the air separator 36 has furthermore been attached a vacuum device 40. However, in the embodiment of FIG. 2 the pressure switch 38 and vacuum device 40 are not absolutely needed. In the exhaust pipe leading away from the air separator 36 is installed a pumping device 43, whence the liquid is conducted through the control device 35 and the tubular filter 44 to the volumetric device 45, adn thence further through the directional valve 45 to the tank 47 or equivalent. In FIG. 2 has also been shown the power source 48 for the pumping device, which may be e.g. a hydraulic, pneumatic, electrical or equivalent power source.

The operation of the means 30 of the invention is as follows. When the suction tube 34 has been connected to the liquid tank 31, the shut-off valve 32 of the tank is opened, whereby the liquid will flow through the suction tube 34 and through the entrance connector 34a into the air separator 36. As liquid flows into the air separator 36, air escapes from the air separator 36 through the air venting valve 39 and the directional valve 41 to the vacuum device 40 and thence further to the atmosphere. The air separator 36 contains a liquid level sensor 37, which moves within the air separator in accordance with the liquid level height. The liquid level sensor 37 has been connected to the control device 35 in equivalent manner as in the embodiment of FIG. 1. When the liquid level in the air separator is on the lower level B or therebelow, the control valve is fully closed. As the liquid level rises in the air separator 36, the control device 35 connected to the liquid level sensor 37 begins to open, and when the liquid level reaches the upper level A the control device 35 has opened fully. Similarly, when the liquid level falls, the control device 35 closes by a distance consistent with the liquid level height. The pumping device 43 may be activated before starting operations, or only when the liquid level in the air separator 36 has risen to the upper level A. When the pumping device 43 has been activated, the liquid will flow from the pumping device to the control valve 35 and thence further through the tubular filter 44 through the volumetric device 45, and through the directional valve 46 to the tank 47. The pumping device is stopped when the liquid in the tank 31 has been used up and the liquid level is at the lower level B in the air separator 36. If a vacuum device 40 is connected to the means 30, its control can be connected to control the pressure switch 38 at the same time, or separately when the pumping device 43 is deactivated, respectively stopped.

The means 30 of the invention depicted in FIG. 2 removes from the liquid the air bubble and part of the dissolved air. At the same time, the means takes care at the beginning and end of pumping of retention of the liquid quantity in the same system. Hereby the means 30 standardizes its proper volume and enables a volumetric device 45 to be used.

The liquid height levels A and B in the air separator 16, respectively 36, introduced in the preceding description and in FIGS. 1 and 2 are not fixed: they change in accordance with the flow. When the flow rate is high, the distance between levels A and B is larger than when the flow rate is low. The changing of levels A and B is above all influenced by the internal construction of the control device 15, respectively 35, which is more closely described later on.

In FIG. 3 is schematically presented the control device 15, respectively 35, employed in the means 10, respectively 30, of FIGS. 1 and 2. The control device 15,35, which is a control valve, comprises a valve body 51 enclosing within itself a control piston 52 with packings. Inside the control valve 15,35 are provided, concentrically with the control piston 52, a first pilot valve 53 and a second pilot valve 54, these valves having been disposed in a bore in the control piston 52. The pilot valves 53 and 54 have been disposed on one and the same spindle, whereby they move synchronously. The spindle 55 of the pilot valves has been connected to the liquid level sensor 17, respectively 37, in the air separator 16, respectively 36, by the connection 56. In the control valve have furthermore been formed, a liquid entrance volume 57 disposed partly inside the control piston 52 and a liquid outflow volume 58, which has been established in the pipe leading away from the valve. The valve has, furthermore, on the opposite side of the control piston as related to the liquid entrance volume 57, an auxiliary liquid control volume 59. The control valve 15,35 is attached to the wall 61 of the air separator, and an aperture 60 has been made for the valve in the wall 61, this aperture defining a volume 60 communicating with the interior volume of the air separtor 16,36.

The operation of the control valve 15,35 of FIG. 3 is as follows. The liquid is conducted into the liquid entrance volume 57 under a pressure which is higher or lower than the pressure prevailing in the volume 60 in the air separator. The position of the control piston 52 is defined by means of the position of the control spindle 55. The control valve 15,35 (or rather the control piston 52 closes and stays closed when the spindle 55 of the pilot valves is moved in the closing direction, that is to the right in FIG. 3, so that the second pilot valve 54 closes and the first pilot valve 53 opens. The iquid will then flow from the entrance volume 57 into the auxiliary liquid control volume 59 and its flow into the liquid outflow volume 58 and into the volume 60 in the air separator is inhibited. The liquid pressure prevailing in the auxiliary control volume 59 urges the control piston 52 into its closed position towards the liquid entrance volume 57 with a force higher than that with which the liquid pressure in the liquid entrance volume 57 tends to urge the control piston 52 into the open position, because the surface areas acting on the control piston 52 in the auxiliary control volume 59 are larger than the areas of the control piston 52 in the liquid entrance volume 57. With increasing liquid pressure, the force pushing on the piston 52 from the auxiliary volume 59 correspondingly increases and the valve 15,35 closes with progressively increasing force. From the liquid entrance volume 57 there exists at this time a free flow connection to the auxiliary liquid control volume 59.

When it is desired to open the flow path from the liquid entrance volume 57 to the liquid outflow volume 58, the control spindle 55 is pulled so (to the left in FIG. 3) that the second pilot valve 54 opens and the first pilot valve 53 closes, whereby the liquid can flow from the auxiliary liquid control volume 59 into the volume 60 in the air separator and the pressure in the auxiliary control volume 59 falls below the pressure prevailing in the liquid entrance volume 57. The pressure in the entrance volume 57 will then push the control piston 52 towards the auxiliary control volume 59 and the control piston 52 will slowly open the flow path from the entrance volume 57 to the outflow volume 58. The control spindle 55 can be used for stepless control of the control piston and thereby the flow rate from the liquid entrance volume 57 to the liquid outflow volume 58 can be changed.

When the flow rate from the entrance volume 57 to the outflow volume 58 is high, the liquid exerts on the control piston 52 a high inertia force (dynamic pressure) and therefore closing the control piston 52 would require an unreasonably high force. In the design of the present invention, this force is derived from the flow energy of the liquid, in the following manner. The control spindle 55 is used to close the second pilot valve 54 and to open the first pilot valve 53, whereby the pressure increase on the side of the control piston 52 facing the entrance volume 57 is conducted from the entrance volume 57 to the auxiliary control volume 59. When liquid flows from the entrance volume 57 to the auxiliary control volume 59, the pressure increase in the auxiliary control volume 59 begins slowly to close the control piston 52, until the liquid flow from the entrance volume 57 to the outflow volume 58 is inhibited.

It is possible by proper dimensioning of the pilot valves 53 and 54 and of the capacity of the auxiliary control volume 59 to predetermine the opening and closing speed of the control piston 52 so that no dangerous and detrimental pressure increase or pressure drops can develop. Delay of the action is caused by the flow time of the liquid from the entrance volume 57 through the first pilot valve 53 into the auxiliary control volume 59 and from the auxiliary control volume 59 and from the auxiliary control volume 59 through the second pilot valve 54 to the volume 60 in the air separator, or vice versa, depending on the differential pressures between the volumes 57,59 and 60. The control valve 15,35 of the invention controls the liquid flow with minimal control force, and it derives the control energies from the energy in the liquid, and at the same time it adapts to the state of motion or pressure of the liquid at any given time.

In the foregoing, the invention has only been described with reference to the advantageous embodiments depicted in the figures. It is however not intended hereby to restrict the invention to concern these examples only: numerous modifications are feasible within the scope of the inventive idea defined by the claims following below.

I claim:

1. A procedure for use in pumping foodstuff liquids, wherein the foodstuff liquid is conducted through a suction pipe (14) or a suction tube into an air separator (16) and from the air separator (16) through a pumping device (23) further onwards, and wherein the air present among the foodstuff liquid is separated in the air separator (16) with the aid of vacuum in that a vacuum device (20) is activated when the pressure prevailing in the air separator (16) is higher than a preset value, characterized in that the flow of the foodstuff liquid to the air separator (16) is controlled with a control device (15) disposed in the suction pipe (14), this control device being controlled in accordance with the level of the foodstuff liquid in the air separator (16) so that when the level of the foodstuff liquid reaches in the air separator (16) an upper level (A) dependent on the magnitude of the flow the control device (15) has been arranged to be fully closed, and when the level of the foodstuff liquid reaches in the air separator (16) a lower level (B) dependent on the magnitude of the flow the control device (15) has been arranged to be fully open, and when the level of the foodstuff liquid is falling in the air separator (16) between said upper level (A) and said lower level (B) the control device (15) has been arranged to increase the foodstuff liquid flow entering the air separator (16), and when the level of the foodstuff liquid is rising in the air separator (16) between said upper level (A) and said lower level (B) the control device (15) has been arranged to reduce the foodstuff liquid flow entering the air separator (16).

2. Procedure according to claim 1, characterized in that with the control device (15) is changed the amount of flow drawn off from the air separator (16), linearly as the height of the foodstuff liquid level changes in the air separator (16) between said upper level (A) and said lower level (B).

3. Procedure according to claim 1, characterized in that when the level of the foodstuff liquid reaches said upper level (A) the control device (15) closes the flow substantially at once and when the level of the foodstuff liquid falls to said lower level (B) the control device (15) opens to be fully open, substantially at once.

4. Means for use in pumping foodstuff liquids, said means (10) comprising a suction pipe (14) or a suction tube, a control valve (14), an air separator (16) provided with a vacuum device (20) for removing air from the foodstuff liquid in the air separator (16), and a pumping device (23), by the aid of said means (10) the foodstuff liquid being drawn from a liquid tank (11) or equivalent to the air separator (16), whence the foodstuff liquid is conducted through the pumping device (23) further onwards, characterized in that the control valve (15) disposed in the suction pipe (14) has been arranged to control the flow of foodstuff liquid to the air separator (16) in such manner that when the level of the foodstuff liquid reaches in the air separator (16) an upper level (A) dependent on the magnitude of the flow the control device (15) has been arranged to be fully closed, and that when the level of the foodstuff liquid reaches in the air separator (16) a lower level (B) dependent on the magnitude of the flow the control device (15) has been arranged to be fully open, and when the level of the foodstuff liquid is falling in the air separator (16) between said upper level (A) and said lower level (B) the control device (15) has been arranged to increase the foodstuff liquid flow entering the air separator (16), and when the level of the foodstuff liquid is rising in the air separator (16) between said upper level (A) and said lower level (B) the control device (15) has been arranged to reduce the foodstuff liquid flow entering the air separator (16).

5. A procedure for use in volumetry of foodstuff liquids, wherein the foodstuff liquid is conducted through a suction pipe or a suction tube (34) to an air separator (36) and from the air separator through a pumping device (43) and a volumetric device (45) into a tank (47), and wherein the air present among the foodstuff liquid is separated in the air separator (36), characterized in that the flow of foodstuff liquid from the air separator (36) through the pumping device (43) further onwards is controlled with a control device (35) which is controlled in accordance with the level of the foodstuff liquid in the air separator (36) in such manner that when the level of the foodstuff liquid reaches in the air separator (36) an upper level (A) dependent on the magnitude of the flow the control device (35) has been arranged to be fully open, and when the level of the foodstuff liquid reaches in the air separator (36) a lower level (B) dependent on the magnitude of the flow the control device (35) has been arranged to be fully closed, and when the level of the foodstuff liquid is falling in the air separator (36) between said upper level (A) and said lower level (B) the control device (35) has been arranged to reduce the foodstuff liquid flow drawn from the air separator (36), and when the level of the foodstuff liquid is rising in the air separator (36) between said upper level (A) and said lower level (B) the control device (35) has been arranged to increase the foodstuff liquid flow drawn from the air separator (36).

6. Procedure according to claim 5, characterized in that with the control device (35) is changed the amount of the flow drawn off from the air separator (36), linearly as the height of the foodstuff liquid level changes in the air separator (36) between said upper level (A) and said lower level (B).

7. Procedure according to claim 5, characterized in that when the level of the foodstuff liquid reaches said upper level (A) the control device (35) opens fully substantially at once, and when the level of the foodstuff liquid falls to said lower level (B) the control device (35) closes the flow substantially at once.

8. A means for use in volumetry of foodstuff liquids, comprising a suction pipe or a suction tube (34), an air separator (36) provided with an air venting valve (39), a pumping device (43), and a control valve (35), by said means (30) the foodstuff liquid being drawn from a liquid tank (31) or equivalent to the air separator (36), whence the foodstuff liquid is conducted through the pumping device (43) and the control valve (35), through a volumetric device (45) into a tank (47) or equivalent, characterized in that the control valve (35) has been arranged to control the flow of foodstuff liquid from the air separator (36) through the pumping device (43) further onwards in such manner that when the level of the foodstuff liquid reaches in the air separator (36) an upper level (A) dependent on the magnitude of the flow the control valve (35) has been arranged to be fully open, and when the level of the foodstuff liquid reaches in the air separator (36) a lower level (B) dependent on the magnitude of the flow the control valve (35) has been arranged to be fully closed, and when the level of the foodstuff liquid is falling in the air separator (36) between said upper level (A) and said lower level (B) the control valve (35) has been arranged to reduce the foodstuff liquid flow drawn from the air separator (36), and when the level of the foodstuff liquid is rising in the air separator (36) between said upper level (A) and said lower level (B) the control valve (35) has been arranged to increase the foodstuff liquid flow drawn from the air separator (36).

* * * * *